US012307987B2

(12) United States Patent
Xi

(10) Patent No.: US 12,307,987 B2
(45) Date of Patent: May 20, 2025

(54) DISPLAY DEVICE AND DRIVING METHOD THEREOF

(71) Applicants: Huizhou China Star Optoelectronics Display Co., Ltd., Guangdong (CN); Shenzhen China Star Optoelectronics Semiconductor Display Technology Co., Ltd., Guangdong (CN)

(72) Inventor: Yue Xi, Guangdong (CN)

(73) Assignees: Huizhou China Star Optoelectronics Display Co., Ltd., Huizhou (CN); Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/607,536

(22) PCT Filed: Sep. 28, 2021

(86) PCT No.: PCT/CN2021/121133
§ 371 (c)(1),
(2) Date: Oct. 29, 2021

(87) PCT Pub. No.: WO2023/039944
PCT Pub. Date: Mar. 23, 2023

(65) Prior Publication Data
US 2024/0029673 A1 Jan. 25, 2024

(30) Foreign Application Priority Data
Sep. 16, 2021 (CN) ......................... 202111088131.6

(51) Int. Cl.
*G09G 3/34* (2006.01)

(52) U.S. Cl.
CPC ... *G09G 3/3426* (2013.01); *G09G 2320/0233* (2013.01); *G09G 2320/0276* (2013.01); *G09G 2330/021* (2013.01)

(58) Field of Classification Search
CPC .......... G09G 3/20; G09G 5/10; G09G 3/3291; G09G 3/36; G09G 3/3426;
(Continued)

(56) References Cited

U.S. PATENT DOCUMENTS

2015/0084996 A1* 3/2015 Yamakawa .......... G09G 3/3648 345/690
2018/0240415 A1* 8/2018 Chen .................... G09G 3/3607
(Continued)

FOREIGN PATENT DOCUMENTS

CN 102456313 5/2012
CN 103761947 4/2014
(Continued)

*Primary Examiner* — Michael A Faragalla

(57) ABSTRACT

A display device and a driving method thereof are provided. The driving method of the display device includes: adjusting a first white balance data table corresponding to an image to be displayed into a second white balance data table if the image to be displayed is a heavy load image and driving the display device to display the image to be displayed according to the second white balance data table, wherein a white balance parameter corresponding to at least one gray level in the first white balance data table is greater than a white balance parameter corresponding to the at least one gray level in the second white balance data table.

14 Claims, 8 Drawing Sheets

(58) Field of Classification Search
CPC ... G09G 2320/0233; G09G 2320/0276; G09G 2330/021
See application file for complete search history.

(56) References Cited

U.S. PATENT DOCUMENTS

| | | | | |
|---|---|---|---|---|
| 2019/0043429 | A1* | 2/2019 | Yu | G09G 3/2092 |
| 2019/0158823 | A1* | 5/2019 | Lee | H04N 17/02 |
| 2020/0066199 | A1* | 2/2020 | Song | G09G 3/3208 |

FOREIGN PATENT DOCUMENTS

| | | |
|---|---|---|
| CN | 106782421 | 5/2017 |
| CN | 107820070 | 3/2018 |
| CN | 108616691 | 10/2018 |
| CN | 109144200 | 1/2019 |
| CN | 109996054 | 7/2019 |
| CN | 110264969 | 9/2019 |
| CN | 110969980 | 4/2020 |
| CN | 111540329 | 8/2020 |
| CN | 112530380 | 3/2021 |
| JP | 2001-313953 | 11/2001 |
| KR | 10-2013-0036676 | 4/2013 |

* cited by examiner

First white balance data table

| Gray level | R0 | G0 | B0 |
|---|---|---|---|
| 0 | 0 | 0 | 0 |
| 1 | 4 | 4 | 4 |
| 2 | 8 | 8 | 8 |
| 3 | 12 | 12 | 12 |
| ... | ... | ... | ... |
| 253 | 1012 | 1012 | 1012 |
| 254 | 1016 | 1016 | 1016 |
| 255 | 1020 | 1020 | 1020 |

⇨

Second white balance data table

| Gray level | R0 | G0 | B0 |
|---|---|---|---|
| 0 | 0 | 0 | 0 |
| 1 | 4 | 4 | 4 |
| 2 | 8 | 8 | 8 |
| 3 | 12 | 12 | 12 |
| ... | ... | ... | ... |
| 253 | 976 | 976 | 976 |
| 254 | 980 | 980 | 980 |
| 255 | 984 | 984 | 984 |

FIG. 1

DISPLAY DEVICE AND DRIVING METHOD THEREOF

RELATED APPLICATIONS

This application is a National Phase of PCT Patent Application No. PCT/CN2021/121133 having International filing date of Sep. 28, 2021, which claims the benefit of priority of China Patent Application No. 202111088131.6 filed on Sep. 16, 2021. The contents of the above applications are all incorporated by reference as if fully set forth herein in their entirety.

FIELD AND BACKGROUND OF THE INVENTION

The present application relates to a field of display technology and particularly relates to a display device and a driving method thereof.

With people's continuous pursuit of display quality, high refresh rate (for example, 120 HZ) and high image quality (for example, 8K resolution) liquid crystal displays will inevitably become a future development trend. However, there will be some heavy load images in a high refresh rate and high image quality panel driving architecture. When displaying the heavy load images, the phenomenon of the data voltage frequently switches between high level and low level will occur.

Due to a large voltage difference before and after switching, temperature of a source driver will be too high, which will damage the source driver, make it unable to work normally, and cause a large amount of current consumption, thereby increasing power consumption of a display device. Currently, the industry usually adds heat sinks on a driver chip or uses a high-end chip with high current resistance and low power consumption to solve an overheating problem of the driver chip, but this method will increase production cost and is not conducive to mass production of the display device.

Therefore, it is urgent to propose a technical solution to solve high power consumption of the heavy load images.

SUMMARY OF THE INVENTION

The present application provides a display device and a driving method thereof to solve the technical problem of excessive power consumption when the display device displays a heavy load image in the prior art.

The present application provides a driving method of a display device, including: obtaining an image to be displayed; determining whether the image to be displayed is a heavy load image; adjusting a first white balance data table corresponding to the image to be displayed into a second white balance data table if the image to be displayed is the heavy load image, wherein a white balance parameter corresponding to at least one gray level in the first white balance data table is greater than a white balance parameter corresponding to the at least one gray level in the second white balance data table; and driving the display device to display the image to be displayed according to the second white balance data table.

Optionally, in some embodiments of the present application, the step of adjusting the first white balance data table corresponding to the image to be displayed into the second white balance data table includes: obtaining a red pixel white balance component, a green pixel white balance component, and a blue pixel white balance component of each gray level in the first white balance data table; and reducing a red pixel white balance component, a green pixel white balance component, and a blue pixel white balance component corresponding to at least one gray level according to a difference between power consumption of the heavy load image and preset power consumption.

Optionally, in some embodiments of the present application, the step of reducing the red pixel white balance component, the green pixel white balance component, and the blue pixel white balance component corresponding to the at least one gray level according to the difference between the power consumption of the heavy load image and the preset power consumption includes: reducing the red pixel white balance component, the green pixel white balance component, and the blue pixel white balance component corresponding to the at least one gray level; obtaining power consumption of the display device, and determining the second white balance data table if the power consumption of the display device is less than the preset power consumption; and continuing to reduce the red pixel white balance component, the green pixel white balance component, and the blue pixel white balance component until the power consumption of the display device is less than the preset power consumption if the power consumption of the display device is greater than the preset power consumption.

Optionally, in some embodiments of the present application, the step of adjusting the first white balance data table corresponding to the image to be displayed into the second white balance data table includes: pre-configuring a correspondence table including multiple sets of heavy load images and corresponding white balance data tables; and searching in the correspondence table according to the heavy load image to match and obtain a corresponding second white balance data table if the image to be displayed is a heavy load image.

Optionally, in some embodiments of the present application, before the step of driving the display device to display the image to be displayed according to the second white balance data table further includes: performing a gamma correction on the second white balance data table according to a target gamma curve and/or performing a white balance correction on the second white balance data table according to target color points.

Optionally, in some embodiments of the present application, the driving method of the display device further includes: increasing backlight brightness of the display device if the image to be displayed is a heavy load image.

Optionally, in some embodiments of the present application, the step of increasing the backlight brightness of the display device if the image to be displayed is the heavy load image includes: increasing light source driving voltage of the backlight module to increase the backlight brightness of the backlight module.

Optionally, in some embodiments of the present application, the step of increasing the backlight brightness of the display device if the image to be displayed is the heavy load image includes: outputting a feedback signal to the backlight module if the image to be displayed is a heavy load image, and the backlight module increasing backlight brightness of the display device according to the feedback signal.

Optionally, in some embodiments of the present application, the step of determining whether the image to be displayed is a heavy load image includes: obtaining brightness distribution characteristics of a heavy load image; obtaining brightness distribution characteristics of the image to be displayed; and comparing the brightness distribution characteristics of the heavy load image with the brightness distribution characteristics of the image to be displayed, and determining that the image to be displayed is a heavy load image if the brightness distribution characteristics of the heavy load image is the same as the brightness distribution characteristics of the image to be displayed.

Optionally, in some embodiments of the present application, the step of obtaining the brightness distribution characteristics of the heavy load image includes: obtaining a pixel driving architecture type of the display device; and determining the brightness distribution characteristics of the heavy load image according to the pixel driving architecture type.

Optionally, in some embodiments of the present application, the driving method of the display device further includes: driving the display device to display the image to be displayed according to the first white balance data table if the image to be displayed is a non-heavy load image.

The present application further provides a driving method of a display device, including: obtaining an image to be displayed; determining whether the image to be displayed is a heavy load image; adjusting a first white balance data table corresponding to the image to be displayed into a second white balance data table if the image to be displayed is the heavy load image and driving the display device to display the image to be displayed according to the second white balance data table; and driving the display device to display the image to be displayed according to the first white balance data table if the image to be displayed is a non-heavy load image, wherein a white balance parameter corresponding to at least one gray level in the first white balance data table is greater than a white balance parameter corresponding to the at least one gray level in the second white balance data table, and improving a backlight brightness of the display device; driving the display device to display the image to be displayed according to the second white balance data table.

Optionally, in some embodiments of the present application, the step of adjusting the first white balance data table corresponding to the image to be displayed into the second white balance data table includes: obtaining a red pixel white balance component, a green pixel white balance component, and a blue pixel white balance component of each gray level in the first white balance data table; and reducing a red pixel white balance component, a green pixel white balance component, and a blue pixel white balance component corresponding to at least one gray level according to a difference between power consumption of the heavy load image and preset power consumption.

Optionally, in some embodiments of the present application, the step of reducing the red pixel white balance component, the green pixel white balance component, and the blue pixel white balance component corresponding to the at least one gray level according to the difference between the power consumption of the heavy load image and the preset power consumption includes: reducing the red pixel white balance component, the green pixel white balance component, and the blue pixel white balance component corresponding to the at least one gray level; obtaining power consumption of the display device, and determining the second white balance data table if the power consumption of the display device is less than the preset power consumption; and continuing to reduce the red pixel white balance component, the green pixel white balance component, and the blue pixel white balance component until the power consumption of the display device is less than the preset power consumption if the power consumption of the display device is greater than the preset power consumption.

Optionally, in some embodiments of the present application, the step of adjusting the first white balance data table corresponding to the image to be displayed into the second white balance data table includes: pre-configuring a correspondence table comprising multiple sets of heavy load images and corresponding white balance data tables; and searching in the correspondence table according to the heavy load image to match and obtain a corresponding second white balance data table if the image to be displayed is a heavy load image.

Optionally, in some embodiments of the present application, before the step of driving the display device to display the image to be displayed according to the second white balance data table further includes: performing a gamma correction on the second white balance data table according to a target gamma curve and/or performing a white balance correction on the second white balance data table according to target color points.

Optionally, in some embodiments of the present application, the step of determining whether the image to be displayed is a heavy load image includes: obtaining brightness distribution characteristics of a heavy load image; obtaining brightness distribution characteristics of the image to be displayed; and comparing the brightness distribution characteristics of the heavy load image with the brightness distribution characteristics of the image to be displayed, and determining that the image to be displayed is a heavy load image if the brightness distribution characteristics of the heavy load image is the same as the brightness distribution characteristics of the image to be displayed.

Optionally, in some embodiments of the present application, the step of obtaining the brightness distribution characteristics of the heavy load image includes: obtaining a pixel driving architecture type of the display device; and determining the brightness distribution characteristics of the heavy load image according to the pixel driving architecture type.

Correspondingly, the present application further provides a display device, including: an obtaining module configured to obtain an image to be displayed; a detection module configured to determine whether the image to be displayed is a heavy load image; an adjustment module configured to adjust a first white balance data table corresponding to the image to be displayed into a second white balance data table when the image to be displayed is the heavy load image, wherein a white balance parameter corresponding to at least one gray level in the first white balance data table is greater than a white balance parameter corresponding to the at least one gray level in the second white balance data table; and a driving module configured to drive the display device to display the image to be displayed according to a second gamma voltage.

Optionally, in some embodiments of the present application, the adjustment module is further configured to reduce a red pixel white balance component, a green pixel white balance component, and a blue pixel white balance component corresponding to at least one gray level in the first white balance data table according to a difference between power consumption of the heavy load image and preset power consumption to obtain the second white balance data table.

The present application provides a display device and a driving method thereof. In the driving method of the display device, when it is determined that an image to be displayed is a heavy load image, a first white balance data table corresponding to the image to be displayed is adjusted to a second white balance data table. Wherein, a white balance parameter corresponding to at least one gray level in the first white balance data table is greater than a white balance parameter corresponding to the at least one gray level in the second white balance data table. The present application reduces the white balance parameters in the first white balance data table corresponding to a heavy load image and drives the display device to display the heavy load image according to the second white balance data table, which can reduce the power consumption of the display device when displaying the heavy load image and prevent the display quality from being affected by the temperature increase of the source driver chip. In this way, the present invention solves the problem of overheating when the source driver chip displays a heavy load image with less cost.

BRIEF DESCRIPTION OF THE SEVERAL VIEWS OF THE DRAWINGS

In order to describe the technical solutions in the embodiments of the present application more clearly, the following will briefly introduce the drawings that need to be used in the description of the embodiments. Obviously, the drawings in the following description are only some embodiments of the application. For those skilled in the art, other drawings can be obtained based on these drawings without doing creative work.

FIG. 1 is a diagram of a conversion relationship between a first white balance data table and a second white balance data table provided by the present application.

SPECIFIC EMBODIMENTS OF THE INVENTION

Figure 2:
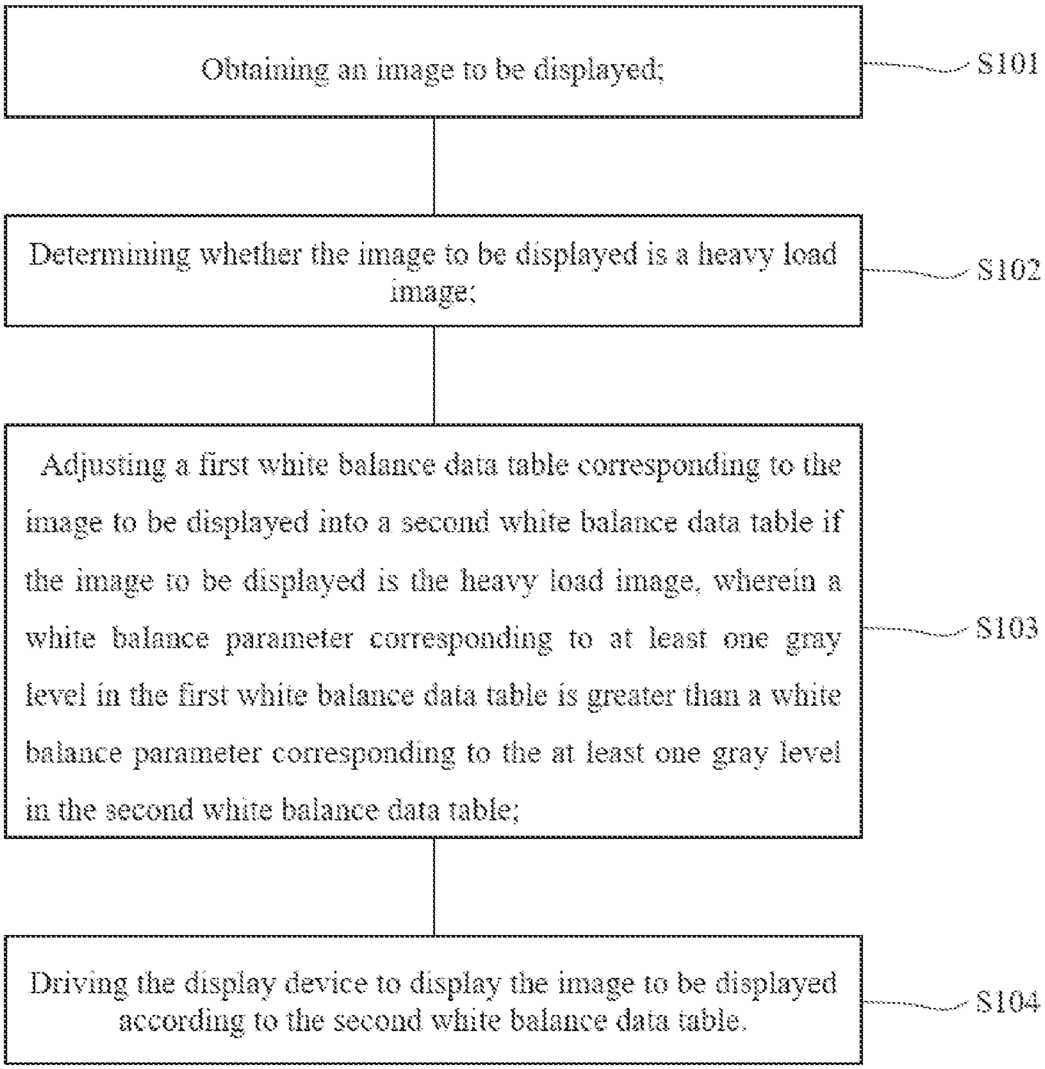
FIG. 2 is a first flowchart of a driving method of a display device provided in the present application.

The following will clearly and completely describe the technical solutions in the embodiments of the present application with reference to the drawings in the embodiments of the present application. Obviously, the embodiments are only a part of the embodiments of the present application, rather than all the embodiments. Based on the embodiments in the present application, all other embodiments obtained by those skilled in the art without doing creative work shall fall within the protection scope of the present application. Furthermore, the specific implementations described herein are only used to illustrate and explain the application, and are not used to limit the application. In addition, the terms "first" and "second" are only used for descriptive purposes, and should not be understood as indicating or implying relative importance or implicitly indicating the number of indicated technical features. Therefore, the features defined with "first" and "second" may explicitly or implicitly include one or more of the features.

The present application provides a display device and a driving method thereof, which will be described in detail below. It should be noted that the description order of the following embodiments is not intended to limit the preferred order of the embodiments of the present application.

In the driving method of the display device provided in the present application, the characteristic information of the heavy load image is first input. Then whether the image to be displayed is a heavy load image is determined according to the characteristic information of the heavy load image, and a first white balance data table corresponding to the image to be displayed is adjusted into a second white balance data table if the image to be displayed is the heavy load image. Wherein a white balance parameter corresponding to at least one gray level in the first white balance data table is greater than a white balance parameter corresponding to the at least one gray level in the second white balance data table. Finally, the display device is driven to display the image to be displayed according to the second white balance data table.

Specifically, please refer to FIG. 1, which is a diagram of a conversion relationship between the first white balance data table and the second white balance data table provided by the present application. In the present application, the image display data of the display device is binary 8-bit, that is, the generation of 256 levels of different brightness gray levels (for example, the 0th gray level to the 255th gray level) is taken as an example for description. However, this should not be construed as a limitation of the present application.

As shown in FIG. 1, in the first white balance data table, each gray level corresponds to a red pixel white balance component R0, a green pixel white balance component G0, and a blue pixel white balance component B0. In the second white balance data table, each gray level also corresponds to a red pixel white balance component R0, a green pixel white balance component G0, and a blue pixel white balance component B0.

The first white balance data table indicates that: 8-bit image display data is converted into 10-bit image display data. For example, the gray level 2 in the 8-bit image display data is equivalent to the gray level 8 in the 10-bit image display data, the gray level 3 in the 8-bit image display data is equivalent to the gray level 12 in the 10-bit image display data, and the gray level 255 in the 8-bit image display data is equivalent to the gray level 1020 in the 10-bit image display data. The first white balance data table is a linear data table, that is, the values of the red pixel white balance component R0, the green pixel white balance component G0, and the blue pixel white balance component B0 corresponding to all gray levels are the same gray level value. The second white balance data table is based on the first white balance data table, and because 8-bit image display data is converted into 10-bit image display data, the adjustable range between the original adjacent gray levels is increased. Therefore, it is more convenient for subsequent white balance adjustment based on the first white balance data table. It should be noted that the white balance adjustment is a technique well known to those skilled in the art, and will not be repeated herein.

Further, the red pixel white balance component R0, the green pixel white balance component G0, and the blue pixel white balance component B0 in the first white balance table are adjusted, so that the white balance parameter corresponding to at least one gray level in the first white balance data table is greater than the white balance parameter corresponding to the gray level in the second white balance data table. Thus, the second white balance parameter is obtained.

It can be understood that the theoretical calculation formula for the power consumption of the display device is: P=a*f*C*V2, where a is the power consumption coefficient, f is the line refresh rate of the display device, C is the panel capacitance of the display device, and V is the variation amplitude of the data voltage on the same data line. It can be seen from the above analysis that the present application reduces the white balance parameters in the first white balance data table corresponding to the heavy load image, and drives the display device to display the heavy load image according to the second white balance data table, which is equivalent to reducing the adjusted gray level corresponding to each original gray level. This can reduce the change amplitude of the data voltage on the same data line, thereby reducing the power consumption of the display device when displaying a heavy load image.

In addition, the present application transforms the heavy load image into a light load image (non-heavy load image) and finally displays it as a light load image. This reduces the brightness change between adjacent rows of sub-pixels driven by the same data line while maintaining the overall brightness of the image to be displayed, reduces the amount of data signal variation, and reduces the load on the source driver chip. Therefore, the problem of overheating when the source driver chip displays a heavy load image is solved with less cost, thereby preventing the display quality from being affected by the temperature increase of the source driver chip.

The present invention will be described in detail below.

Please refer to FIG. 2, which is a flowchart of a driving method of a display device provided by the present application. In the present application, the driving method of the display device specifically includes the following steps: S101, obtaining an image to be displayed.

Generally, the system on chip (SOC) of the display device outputs the video signal to the timing control chip (timer controller, TCON). The timing control chip analyzes the video signal to obtain the data information of the image to be displayed.

S102, determining whether the image to be displayed is a heavy load image.

Specifically, the timing control chip processes the analyzed data information of the image to be displayed, and the brightness information of the image to be displayed can be obtained. Then, whether the image to be displayed is a heavy load image is determined according to the brightness information of the image to be displayed.

Figure 3:
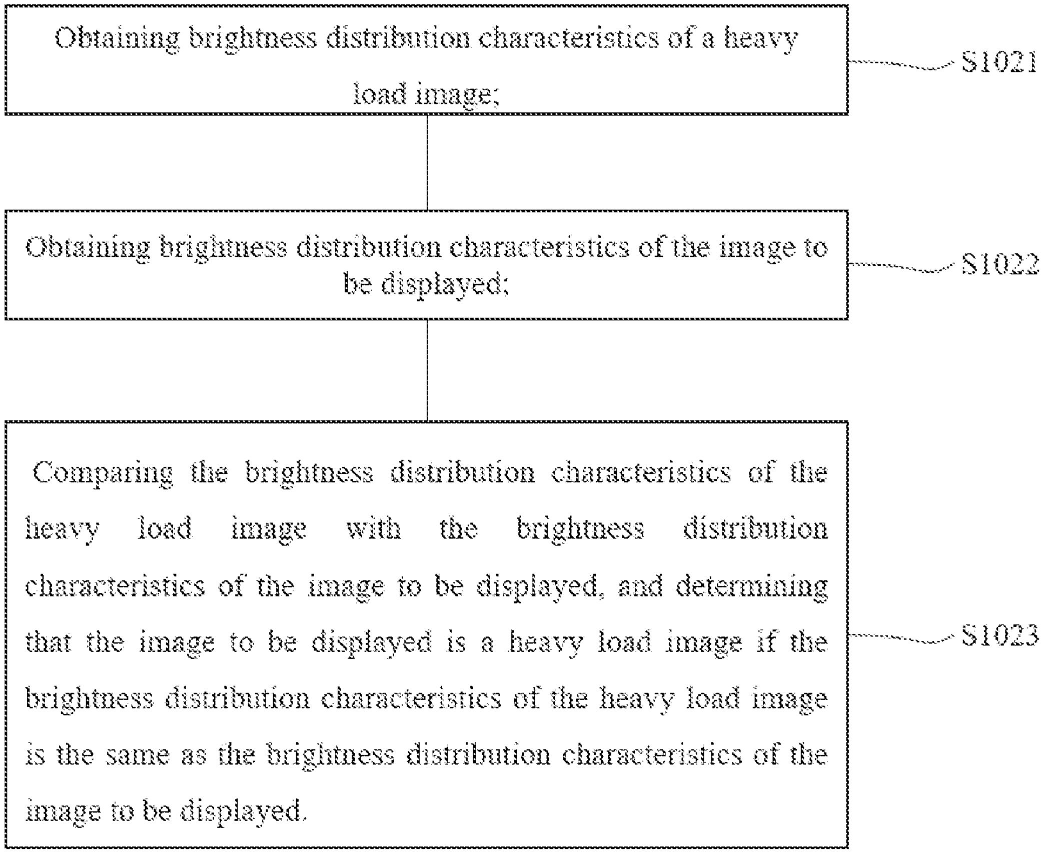
FIG. 3 is a flowchart of step 102 in FIG. 2.

In some embodiments, please refer to FIG. 3, which is a flowchart of step 102 in FIG. 2. Step 102 includes the following steps:

S1021, obtaining brightness distribution characteristics of a heavy load image.

It should be noted that under different pixel driving architecture types, the heavy load image of the display device has different brightness distribution characteristics. Thus, in this step, what is needed first is to obtain a pixel driving architecture type of the display device. Then, the brightness distribution characteristics of the heavy load image is determined according to the pixel driving architecture type.

Figure 4A:
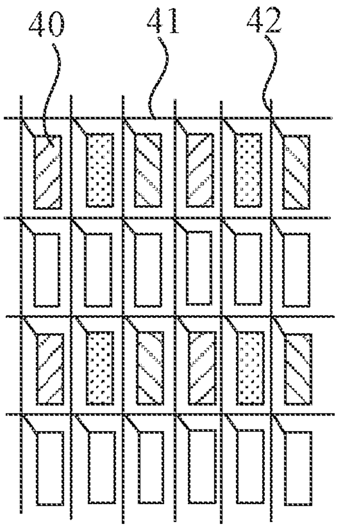
FIG. 4A, FIG. 4B and FIG. 4C are structural schematic diagrams of heavy load images of the display device provided by the present application under a first driving architecture.
Figure 4B:
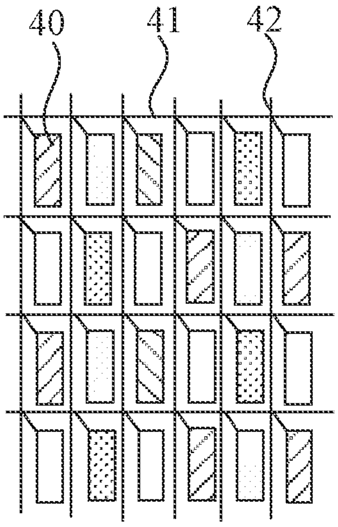
Figure 4C:
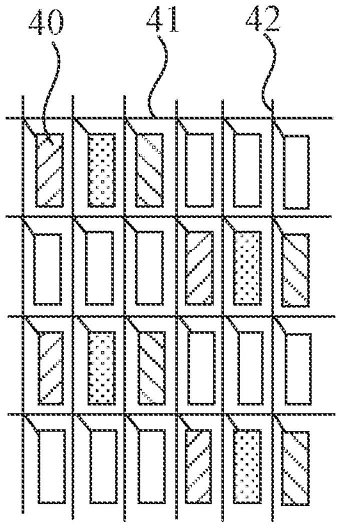
Figure 5A:
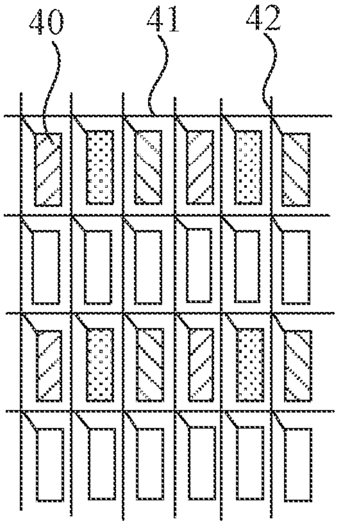
FIG. 5A to FIG. 5B are structural schematic diagrams of heavy load images of the display device provided by the present application under a second driving architecture.
Figure 5B:
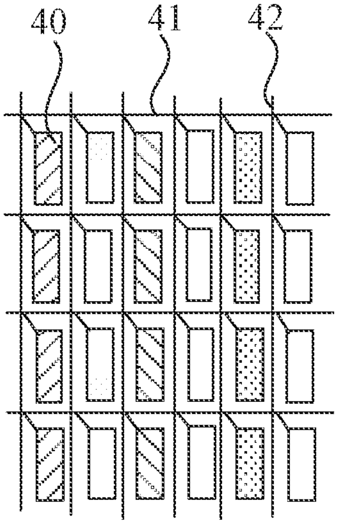

Specifically, please refer to FIG. 4A to FIG. 4C, FIG. 5A, and FIG. 5B. FIG. 4A to FIG. 4C are structural schematic diagrams of heavy load images of the display device provided by the present application under a first driving architecture. FIG. 5A to FIG. 5B are structural schematic diagrams of heavy load images of the display device provided by the present application under a second driving architecture.

FIG. 4 is taken as an example for description in the present application. The display device includes a plurality of data lines 41, a plurality of scan lines 42, and sub-pixels 40 arranged in an array. The data line 41 and the scan line 42 are arranged to cross each other. Each sub-pixel 40 is connected to the corresponding data line 41 and the scan line 42 and is defined by the intersection of the data line 41 and the scan line 42. Every three sub-pixels 40 constitute a pixel unit. Certainly, the pixel driving architecture illustrated in the present application is only an example and should not be understood as a limitation on the present application.

Wherein, the first driving architecture refers to conventional driving architecture, and the second driving architecture refers to a driving architecture with polarity inversion characteristics. It is understandable that, because the liquid crystal molecules are polarized under the driving of a DC voltage and cause image sticking, the pixel driving signal adopts the positive and negative voltage alternating method to drive the liquid crystal molecules. The second driving architecture mainly includes frame inversion, column inversion, row inversion, and dot inversion, etc. according to different polarity inversion modes.

Under the first driving architecture, the heavy load image is an H-strip image, as shown in FIG. 4A. The brightness distribution characteristics of the H-strip image under the first driving architecture are: In two adjacent rows of sub-pixels 40, one row of the sub-pixels 40 are bright, and another row of the sub-pixels 40 are dark. Corresponding to the RGB brightness, that is, when the sub-pixels 40 in the first row are at high potential 1, the sub-pixels 40 in the second row are at low potential 0. Correspondingly, the gray level value of L128 to L255 can be set to high potential, that is, 1, and the gray level value of L0 to L127 is low potential, that is, 0. In the present application, the image display data of the display panel is binary 8-bit, that is, the generation of 256 levels of different brightness gray levels (for example, the 0th gray level to the 255th gray level) is taken as an example for description, but it cannot be understood as a limitation of the present application. As shown in FIG. 4B, the heavy load image is a Dot on-off image. The brightness distribution characteristics of the Dot on-off image are: In two adjacent sub-pixels 40, one sub-pixel 40 is bright and another sub-pixel 40 is dark. That is, when the first sub-pixel 40 is at high potential 1, the second sub-pixel 40 is at low potential. As shown in FIG. 4C, the heavy load image is a Pixel on-off image. The brightness distribution characteristics of the Pixel on-off image are: In two adjacent pixel units, three sub-pixels 40 in one pixel unit are all bright, and three sub-pixels 40 in another pixel unit are all dark.

Under the second driving architecture, this heavy load image is also an H-strip image, as shown in FIG. 5A. The difference from the H-strip image shown in FIG. 4A is that the heavy load image is displayed under the row inversion driving architecture. That is, in two adjacent rows of sub-pixels 40, one row of sub-pixels 40 corresponds to a positive polarity voltage, and another row of sub-pixels 40 corresponds to a negative polarity voltage. As shown in FIG. 5B, the heavy load image is displayed under the column inversion driving architecture. This heavy load image is a V-strip image, and the brightness distribution characteristics of the V-strip image are: In two adjacent columns of sub-pixels 40, one column of sub-pixels 40 are bright, and another column of the sub-pixels 40 are dark. Corresponding to the RGB brightness, that is, one column of sub-pixels has a high potential of 1, and another column of the sub-pixels has a low potential of 0.

Further, the brightness distribution characteristics of the heavy load image can be input into the timing control chip. A storage unit can be provided inside the timing control chip to store the brightness distribution characteristics of the heavy load image. In addition, the brightness distribution characteristics of the heavy load image can be stored in the timing control chip in the form of code.

Wherein, the brightness distribution characteristics of heavy load image input into the timing control chip generally has two dimensions. One is the dimension of RGB brightness, and the other is the dimension of image coordinates and area.

Therefore, the present application inputs the brightness distribution characteristics corresponding to the heavy load image into the timing control chip according to the driving architecture of the display device for subsequent operations. It should be noted that the heavy load images under different driving architectures are not limited to the above examples, and therefore they cannot be understood as a limitation of the present application.

S1022, obtaining brightness distribution characteristics of the image to be displayed.

Specifically, the timing control chip processes the analyzed data information of the image to be displayed to obtain the display gray level of each sub-pixel of the image to be displayed. According to the relationship between the display gray level and the display brightness, the brightness distribution characteristics of the image to be displayed can be obtained.

S1023, comparing the brightness distribution characteristics of the heavy load image with the brightness distribution characteristics of the image to be displayed, and determining that the image to be displayed is a heavy load image if the brightness distribution characteristics of the heavy load image is the same as the brightness distribution characteristics of the image to be displayed.

Specifically, the brightness distribution characteristics of the image to be displayed are compared with the brightness distribution characteristics of the heavy load image. If the brightness distribution characteristics of the image to be displayed are the same as the brightness distribution characteristics of the heavy load image, it is determined that the image to be displayed is a heavy load image. If the brightness distribution characteristics of the image to be displayed are different from the brightness distribution characteristics of the heavy load image, it is determined that the image to be displayed is a non-heavy load image.

The V-strip image shown in FIG. 4A is taken as an example for description. It can be seen from the above embodiment that the brightness distribution characteristics of the V-strip image are: In two adjacent rows of sub-pixels 40, the first row of sub-pixels 40 are at high potential 1, and the second row of sub-pixels 40 are at low potential 0. Then, detect the dimensions of the coordinates and the area. The detection can be started from the upper left corner to (540, 960), that is to detect the sub-pixel 40 located in the first row and the first column to the sub-pixel 40 located in the 540th row and the 960th column. If the detected sub-pixels 40 are all arranged according to the characteristic values of the V-strip image, it is recognized as a V-strip image. Certainly, it is also possible to detect the brightness and darkness of each sub-pixel 40 to compare with the brightness distribution characteristics of the heavy load image, which will not be repeated herein.

S103, adjusting a first white balance data table corresponding to the image to be displayed into a second white balance data table if the image to be displayed is the heavy load image, wherein a white balance parameter corresponding to at least one gray level in the first white balance data table is greater than a white balance parameter corresponding to the at least one gray level in the second white balance data table.

Specifically, the first white balance data table is stored in the timing control chip. The timing control chip can extract the corresponding first white balance data table according to the image to be displayed and obtain the white balance component of the red pixel, the white balance component of the green pixel, and the white balance component of the blue pixel in the first white balance data table for each gray level.

S1032, reducing a red pixel white balance component, a green pixel white balance component, and a blue pixel white balance component corresponding to at least one gray level according to a difference between power consumption of the heavy load image and preset power consumption.

Specifically, the reduction amount of the red pixel white balance component, the green pixel white balance component, and the blue pixel white balance component corresponding to each gray level can be set according to the difference between the power consumption of the heavy load image and the preset power consumption. The reduction amounts of the white balance component of the red pixel, the white balance component of the green pixel, and the white balance component of the blue pixel corresponding to different gray levels may be the same or different.

Wherein, if the difference between the power consumption of the heavy load image and the preset power consumption is large, the amplitude of the reduction can be increased. If the difference between the power consumption of the heavy load image and the preset power consumption is small, the amplitude of the reduction can be reduced.

It should be noted that the red pixel white balance component, the green pixel white balance component, and the blue pixel white balance component can be reduced for each gray level. It is also possible to reduce the red pixel white balance component, the green pixel white balance component, and the blue pixel white balance component only for higher gray levels. Alternately, for the gray levels appearing in the heavy load image, the red pixel white balance component, the green pixel white balance component, and the blue pixel white balance component are reduced.

In addition, a logic unit can be added to the timing control chip to achieve the function of reducing the red pixel white balance component, the green pixel white balance component, and the blue pixel white balance component corresponding to each gray level to obtain the second white balance data table.

Optionally, in some embodiments of the present application, step 1032 includes the following steps: S1032A, reducing a red pixel white balance component, a green pixel white balance component, and a blue pixel white balance component corresponding to at least one gray level.

Specifically, the red pixel white balance component, the green pixel white balance component, and the blue pixel white balance corresponding to at least one gray level in the first white balance data table are reduced in a small range.

S1032B, obtaining power consumption of the display device, and determining the second white balance data table if the power consumption of the display device is less than the preset power consumption.

It is understandable that different customers have different requirements for the power consumption of the display device. For example, in the test of a certain display device, the power consumption of the white image of the display device is usually 3.1 W, and the power consumption of the heavy load image is usually 4.2 W. If the maximum power consumption required by the customer does not exceed 3.6 W, the first white balance data table needs to be adjusted through the above method. Then obtain the actual power consumption of the display device through measurement until it is reduced to 3.6 W. Wherein, the preset power consumption is the power consumption specification requirement when the display device displays the heavy load image, which can be set according to the actual needs of the customer, which is not limited in the present application.

If the power consumption of the display device is less than the preset power consumption, the adjusted first white balance data table is the low temperature white balance data table. Then, it is stored in the memory unit of the timing control chip.

S1032C, continuing to reduce the red pixel white balance component, the green pixel white balance component, and the blue pixel white balance component until the power consumption of the display device is less than the preset power consumption if the power consumption of the display device is greater than the preset power consumption.

It can be understood that driving the display device according to the second white balance data table can reduce the power consumption of the heavy load image, and reduce the brightness of the heavy load image. That is, the solution will not affect the display of the heavy load image, but the overall image brightness is reduced. Therefore, in the process of adjusting the first white balance data table, it is necessary to gradually reduce the red pixel white balance component, the green pixel white balance components, and the blue pixel white balance component. This ensures that the overall brightness of the heavy load image is less affected while reducing the power consumption of the heavy load image.

Therefore, after reducing the red pixel white balance component, the green pixel white balance component, and the blue pixel white balance component, the power consumption of the display device is still greater than the preset power consumption. It is necessary to continue to reduce the red pixel white balance component, the green pixel white balance component, and the blue pixel white balance component until the power consumption of the display device is less than the preset power consumption. It should be noted that the reduction range of the red pixel white balance component, the green pixel white balance component, and the blue pixel white balance component can be set according to the difference between the power consumption of the heavy load image and the preset power consumption. The present application does not specifically limit this.

In some other embodiments of the present application, the step of adjusting the first white balance data table corresponding to the image to be displayed into the second white balance data table includes: S1033, pre-configuring a correspondence table including multiple sets of heavy load images and corresponding white balance data tables. From the foregoing analysis, it can be seen that the display device has different heavy load images under different types of pixel driving architecture. The display device displays different heavy load images, and the power consumption is also different. Therefore, different heavy load images can correspond to different second white balance data tables.

Therefore, after detecting the pixel driving architecture type of the display device, the possible heavy load image of the display device is determined. Different second white balance data tables are determined according to different heavy load images. The brightness distribution characteristics of the heavy load image and the corresponding second white balance data table are stored in the timing control chip. In addition, a correspondence table including multiple sets of heavy load images and corresponding white balance data tables is pre-configured.

S1034, searching in the correspondence table according to the heavy load image to match and obtain a corresponding second white balance data table if the image to be displayed is a heavy load image.

Specifically, when the image to be displayed is a heavy load image, the timing control chip may search for a matching second white balance data table in the correspondence table according to the brightness distribution characteristics of the heavy load image.

In this embodiment, by pre-configuring the correspondence table including multiple sets of heavy load images and the corresponding white balance data tables, the second white balance data table corresponding to the heavy load image to be displayed can be quickly searched according to the correspondence table, thereby improving the response speed of the timing control chip.

S104, driving the display device to display the image to be displayed according to the second white balance data table. Wherein, the first white balance data table and the second white balance data table are both stored in the timing control chip. When the heavy load image is recognized, the timing control chip starts to call the second white balance data table to drive the display device to display the heavy load image according to the second white balance data table.

In addition, if the image to be displayed is a non-heavy load image, the timing control chip starts to call the first white balance data table. The display device is driven to display the image to be displayed according to the first white balance data table.

Figure 6:
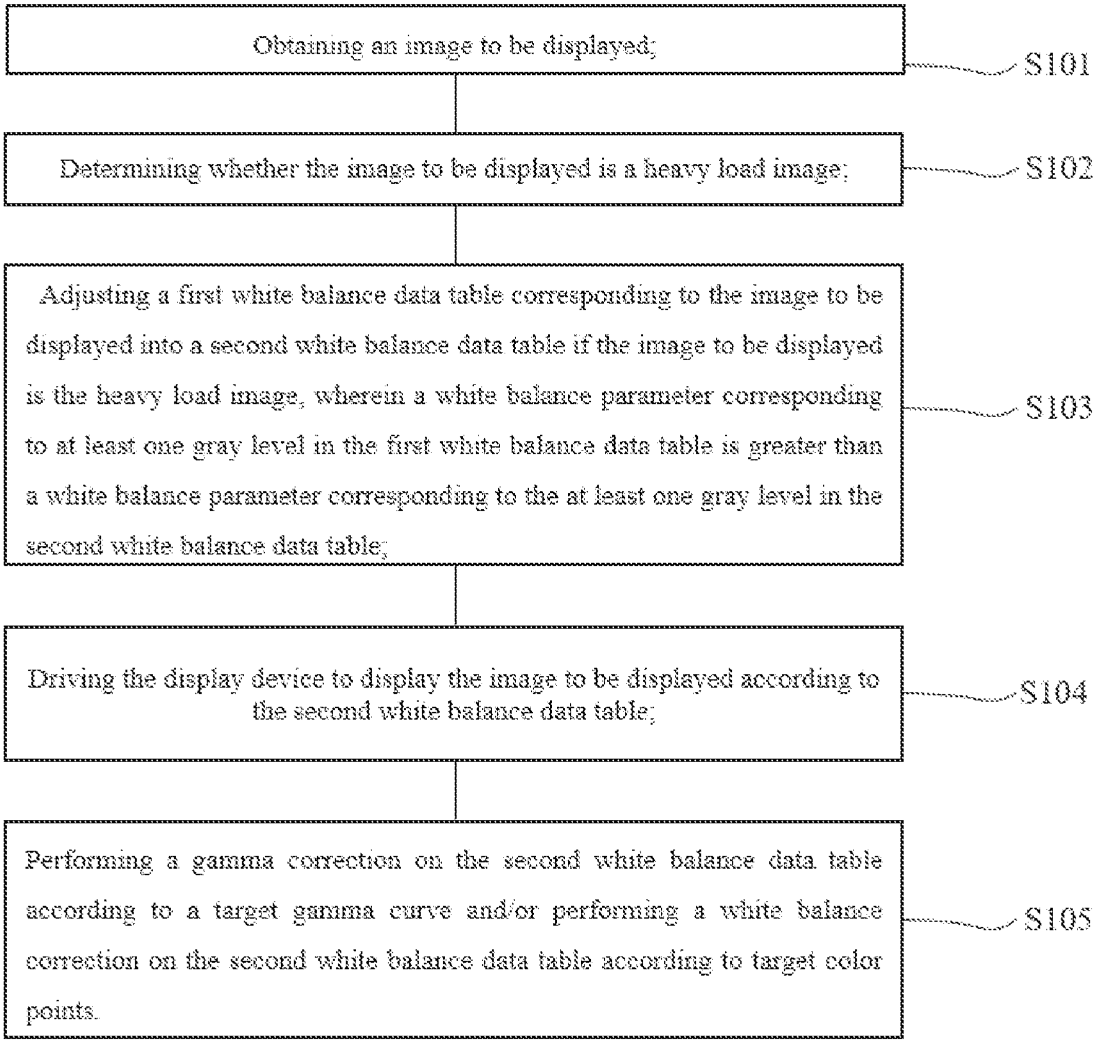
FIG. 6 is a second flowchart of the driving method of the display device provided by the present application.

Please refer to FIG. 6. FIG. 6 is a second flowchart of the driving method of the display device provided by the present application. The difference from the driving method of the display device shown in FIG. 2 is that, in this embodiment, the driving method of the display device further includes the following steps: S105, performing a gamma correction on the second white balance data table according to a target gamma curve and/or performing a white balance correction on the second white balance data table according to target color points.

It can be understood that the brightness perceived by the human eyes and the actual display brightness of the display panel have a non-linear relationship. In a low-brightness environment, the human eye is more sensitive to changes in brightness, and the opposite is true in a high-brightness environment. This characteristic of the human eye is called the gamma characteristic. Due to the non-linear perception of brightness by the human eye, if we need to obtain a uniformly varying brightness experience, the brightness displayed by the display panel needs to vary non-uniformly to adapt to the gamma characteristics of the human eye. Therefore, if the brightness and gray level of the display panel do not meet the target gamma curve, the gamma voltage of the display panel needs to be corrected. In this embodiment, the target gamma curve may be a gamma curve with a gamma parameter of 2.2.

In addition, the white balance adjustment is based on the white color when the sunlight is used as the light source. For the white color when an incandescent lamp or a fluorescent lamp, etc. are used as a light source, adjustments such as red color, blue color, etc. are performed to correct the white color. The target color point is the aforesaid white color. After adjusting the first balance data table to the second white balance data table, the white balance of the red pixel white balance component, the green pixel white balance component, and the blue pixel white balance component corresponding to each gray level can be adjusted according to the target color point so that the luminous brightness meets the requirements of the target color point.

In the present application, the second white balance data table is used to drive the display device to display the heavy load image, and the purpose is to reduce the power consumption of the heavy load image. However, while reducing the power consumption of the heavy load image, it is also necessary to consider the display effect of the heavy load image. Therefore, while the first white balance data table is adjusted to the second white balance data table, the second white balance data table is made to meet the target gamma curve and the target color point, which can improve the display effect and user experience.

Further, the display device includes a backlight module and a display panel. The backlight module is configured to provide a backlight to the display panel. On this basis, the difference from the driving method of the display device shown in FIG. 1 is that, in this embodiment, the driving method of the display device further includes the following steps: S106, increasing backlight brightness of the display device if the image to be displayed is a heavy load image.

It can be seen from the aforesaid embodiment that reducing the power consumption of the heavy load image will reduce the overall brightness of the heavy load image. Generally, according to the measured data, when the power consumption of the heavy load image is reduced to 80% of the original, the overall brightness is reduced by about 10%.

Therefore, in order to reduce the power consumption of the heavy load image while ensuring that the overall display brightness of the heavy load image remains unchanged, in this embodiment, when the display device 100 is driven to display a heavy load image according to the second white balance data table, the backlight brightness of the backlight module 32 can be increased to increase the brightness of the heavy load image, thereby compensating for the decrease in brightness caused by the reduction of the driving voltage.

Specifically, by increasing the driving voltage of the light source in the backlight module 32, the driving current of the backlight source can be increased, thereby increasing the backlight brightness of the backlight module 32. Certainly, the present application is not limited to this. Specifically, the method of increasing the brightness of the backlight can be selected according to the light source structure of the backlight module 32.

Furthermore, in some embodiments of the present application, the timing control chip 33 is connected to the backlight module 32. If the image to be displayed is a heavy load image, the timing control chip 33 transmits a control signal to the backlight module 32. The backlight module 32 increases the brightness of the backlight based on the control signal. In this embodiment, by establishing a communication connection between the timing control chip 33 and the backlight module 32, when the timing control chip 33 recognizes the heavy load image, it can instantly feedback the control signal to the backlight module 32, thereby regulating the backlight brightness of the backlight module 32.

Correspondingly, the present application further provides a display device, which displays an image to be displayed under the driving method of the display device described in any of the aforesaid embodiments. For the driving method of the display device, please refer to the aforesaid embodiments, which will not be repeated herein.

The display device in the present application may be a smartphone, a tablet computer, a video player, a personal computer (PC), etc. The present application does not limit this.

Figure 7:
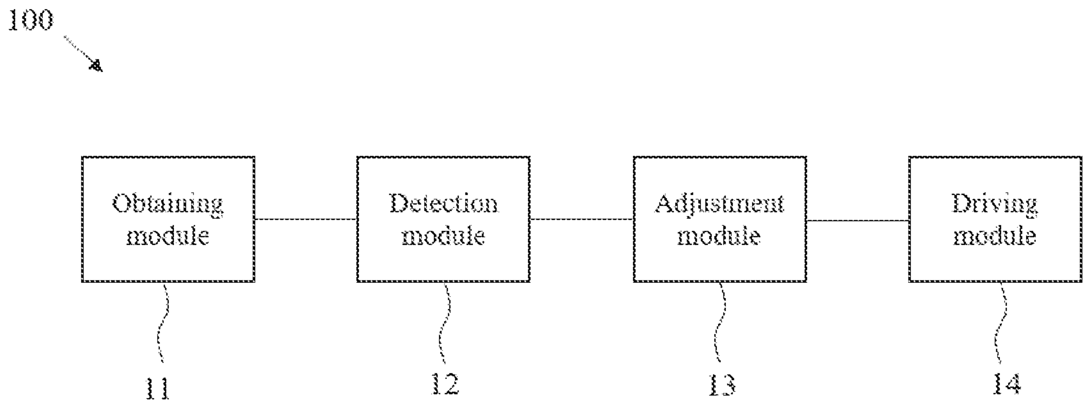
FIG. 7 is a structural schematic diagram of the display device provided by the present application.

Specifically, please refer to FIG. 7, which is a schematic structural diagram of the display device provided by the present application. The display device 100 includes: an obtaining module 11, a detection module 12, an adjustment module 13, and a driving module 14, as follows:

(1) an obtaining module 11, the obtaining module 11 is configured to obtain an image to be displayed. Generally, obtaining module 11 can be provided in a timing control chip. A storage unit can be provided inside the timing control chip to store relevant information of the image to be displayed.

(2) a detection module, the detection module 12 is configured to determine whether the image to be displayed is a heavy load image. Specifically, detection module 12 may process the analyzed data information of the image to be displayed to obtain the display gray level of each sub-pixel of the image to be displayed. The brightness distribution characteristics of the image to be displayed can be obtained according to the relationship between the display gray level and the display brightness. Then, whether the image to be displayed is a heavy load image can be determined according to the brightness distribution characteristics of the image to be displayed.

Specifically, detection module 12 can detect the pixel driving architecture type of the display device 100. Then the brightness distribution characteristics of the heavy load image are determined according to the pixel driving architecture type. The brightness distribution characteristics of the heavy load image are input into the timing control chip. Finally, the brightness distribution characteristics of the image to be displayed are compared with the brightness distribution characteristics of the heavy load image. If the brightness distribution characteristics of the image to be displayed are the same as the brightness distribution characteristics of the heavy load image, it is determined that the image to be displayed is the heavy load image. If the brightness distribution characteristics of the image to be displayed are different from the brightness distribution characteristics of the heavy load image, it is determined that the image to be displayed is a non-heavy load image.

(3) an adjustment module 13, the adjustment module 13 is configured to determine whether the image to be displayed is a heavy load image according to the brightness distribution characteristics of the heavy load image. If the image to be displayed is a heavy load image, the first white balance data table corresponding to the image to be displayed is adjusted to the second white balance data table. Wherein, the white balance parameter corresponding to at least one gray level in the first white balance data table is greater than the white balance parameter corresponding to the gray level in the second white balance data table. Specifically, in some embodiments, the adjustment module 13 reduces a red pixel white balance component, a green pixel white balance component, and a blue pixel white balance component corresponding to at least one gray level in the first white balance data table according to a difference between power consumption of the heavy load image and preset power consumption to obtain the second white balance data table.

(4) Driving module 14, when the image to be displayed is a heavy load image, the driving module 14 is configured to drive the display device 100 to display the heavy load image according to the second white balance data table. When the image to be displayed is a non-heavy load image, the driving module 14 is configured to drive the display device 100 to display the non-heavy load image according to the first white balance data table.

The present application provides a display device 100, and the display device 100 can display images by a driving method of the display device. The driving method of the display device 100 includes: first inputting the characteristic information of the heavy load image. Then determining whether the image to be displayed is a heavy load image according to the characteristic information of the heavy load image, and adjusting a first white balance data table corresponding to the image to be displayed into a second white balance data table if the image to be displayed is the heavy load image. Wherein a white balance parameter corresponding to at least one gray level in the first white balance data table is greater than a white balance parameter corresponding to the at least one gray level in the second white balance data table. Finally, driving the display device to display the image to be displayed according to the second white balance data table. The present application can reduce the power consumption of the display device 100 when displaying a heavy load image, prevent the display quality from being affected by the temperature increase of the source driver chip, and meanwhile reduce the production cost.

The display device and driving method thereof provided by the present application are described in detail above. This specification uses specific examples to explain the principles and implementation of the present application. The description of the above embodiment is only used to help understand the method and core idea of the present application. Meanwhile, for those of ordinary skill in the art, according to the idea of the present application, there will be changes in the specific implementation and the scope of application. As mentioned above, the content of this specification should not be construed as a limitation to the present application.

What is claimed is:

1. A driving method of a display device, comprising:

obtaining an image to be displayed;

determining whether the image to be displayed is a heavy load image;

adjusting a first white balance data table corresponding to the image to be displayed into a second white balance data table if the image to be displayed is the heavy load image, wherein the first white balance data table is a linear data table, and a white balance parameter corresponding to at least one gray level in the first white balance data table is greater than a white balance parameter corresponding to the at least one gray level in the second white balance data table;

performing a white balance correction on the second white balance data table according to target color points; and driving the display device to display the image to be displayed according to the second white balance data table;

wherein the step of determining whether the image to be displayed is a heavy load image comprises:

obtaining brightness distribution characteristics of a heavy load image;

obtaining brightness distribution characteristics of the image to be displayed; and comparing the brightness distribution characteristics of the heavy load image with the brightness distribution characteristics of the image to be displayed, and determining that the image to be displayed is a heavy load image if the brightness distribution characteristics of the heavy load image is the same as the brightness distribution characteristics of the image to be displayed;

wherein the step of obtaining the brightness distribution characteristics of the heavy load image comprises:

obtaining a pixel driving architecture type of the display device; and determining the brightness distribution characteristics of the heavy load image according to the pixel driving architecture type, wherein the display device comprises a plurality of sub-pixels arranged in an array, every three ones of the sub-pixels constituting a pixel unit, wherein the pixel driving architecture type comprises a first driving architecture having no polarity inversion characteristics and a second driving architecture having polarity inversion characteristics, and wherein the brightness distribution characteristics of the heavy load image is at least one of: under the first driving architecture, in two adjacent rows of sub-pixels of the display device, one row of sub-pixels are bright, and another row of sub-pixels are dark; under the first driving architecture, in two adjacent sub-pixels of the display device, one sub-pixel is bright, and another sub-pixel is dark; under the first driving architecture, in two adjacent pixel units of the display device, three sub-pixels in one pixel unit are all bright, and three sub-pixels in another pixel unit are all dark; under the second driving architecture, in two adjacent rows of sub-pixels of the display device, one row of sub-pixels have positive polarity voltages, and another row of sub-pixels have negative polarity voltages; and under the second driving architecture, in two adjacent columns of sub-pixels of the display device, one column of sub-pixels have positive polarity voltages, and another column of sub-pixels have negative polarity voltages.

2. The driving method of the display device of claim 1, wherein the step of adjusting the first white balance data table corresponding to the image to be displayed into the second white balance data table comprises:

obtaining a red pixel white balance component, a green pixel white balance component, and a blue pixel white balance component of each gray level in the first white balance data table; and reducing a red pixel white balance component, a green pixel white balance component, and a blue pixel white balance component corresponding to at least one gray level according to a difference between power consumption of the heavy load image and preset power consumption.

3. The driving method of the display device of claim 2, wherein the step of reducing the red pixel white balance component, the green pixel white balance component, and the blue pixel white balance component corresponding to the at least one gray level according to the difference between the power consumption of the heavy load image and the preset power consumption comprises:

reducing the red pixel white balance component, the green pixel white balance component, and the blue pixel white balance component corresponding to the at least one gray level;

obtaining power consumption of the display device, and determining the second white balance data table if the power consumption of the display device is less than the preset power consumption; and continuing to reduce the red pixel white balance component, the green pixel white balance component, and the blue pixel white balance component until the power consumption of the display device is less than the preset power consumption if the power consumption of the display device is greater than the preset power consumption.

4. The driving method of the display device of claim 1, wherein the step of adjusting the first white balance data table corresponding to the image to be displayed into the second white balance data table comprises:

pre-configuring a correspondence table comprising multiple sets of heavy load images and corresponding white balance data tables; and searching in the correspondence table according to the heavy load image to match and obtain a corresponding second white balance data table if the image to be displayed is a heavy load image.

5. The driving method of the display device of claim 1, wherein before the step of driving the display device to display the image to be displayed according to the second white balance data table further comprises:

performing a gamma correction on the second white balance data table according to a target gamma curve.

6. The driving method of the display device of claim 1, further comprising:

increasing backlight brightness of the display device if the image to be displayed is a heavy load image.

7. The driving method of the display device of claim 6, wherein the step of increasing the backlight brightness of the display device if the image to be displayed is the heavy load image comprises:

increasing light source driving voltage of a backlight module to increase backlight brightness of the backlight module.

8. The driving method of the display device of claim 6, wherein the step of increasing the backlight brightness of the display device if the image to be displayed is the heavy load image comprises:

outputting a feedback signal to the backlight module if the image to be displayed is a heavy load image, and the backlight module increasing the backlight brightness of the display device according to the feedback signal.

9. The driving method of the display device of claim 1, further comprising:

driving the display device to display the image to be displayed according to the first white balance data table if the image to be displayed is a light load image.

10. A driving method of a display device, comprising:

obtaining an image to be displayed;

determining whether the image to be displayed is a heavy load image;

adjusting a first white balance data table corresponding to the image to be displayed into a second white balance data table if the image to be displayed is the heavy load image, performing a white balance correction on the second white balance data table according to target color points, and driving the display device to display the image to be displayed according to the second white balance data table, wherein the first white balance data table is a linear data table; and driving the display device to display the image to be displayed according to the first white balance data table if the image to be displayed is a light load image, wherein a white balance parameter corresponding to at least one gray level in the first white balance data table is greater than a white balance parameter corresponding to the at least one gray level in the second white balance data table;

wherein the step of determining whether the image to be displayed is a heavy load image comprises:

obtaining brightness distribution characteristics of a heavy load image;

obtaining brightness distribution characteristics of the image to be displayed; and comparing the brightness distribution characteristics of the heavy load image with the brightness distribution characteristics of the image to be displayed, and determining that the image to be displayed is a heavy load image if the brightness distribution characteristics of the heavy load image is the same as the brightness distribution characteristics of the image to be displayed;

wherein the step of obtaining the brightness distribution characteristics of the heavy load image comprises:

obtaining a pixel driving architecture type of the display device; and determining the brightness distribution characteristics of the heavy load image according to the pixel driving architecture type, wherein the display device comprises a plurality of sub-pixels arranged in an array, every three ones of the sub-pixels constituting a pixel unit, wherein the pixel driving architecture type comprises a first driving architecture having no polarity inversion characteristics and a second driving architecture having polarity inversion characteristics, and wherein the brightness distribution characteristics of the heavy load image is at least one of: under the first driving architecture, in two adjacent rows of sub-pixels of the display device, one row of sub-pixels are bright, and another row of sub-pixels are dark; under the first driving architecture, in two adjacent sub-pixels of the display device, one sub-pixel is bright, and another sub-pixel is dark; under the first driving architecture, in two adjacent pixel units of the display device, three sub-pixels in one pixel unit are all bright, and three sub-pixels in another pixel unit are all dark; under the second driving architecture, in two adjacent rows of sub-pixels of the display device, one row of sub-pixels have positive polarity voltages, and another row of sub-pixels have negative polarity voltages; and under the second driving architecture, in two adjacent columns of sub-pixels of the display device, one column of sub-pixels have positive polarity voltages, and another column of sub-pixels have negative polarity voltages.

11. The driving method of the display device of claim 10, wherein the step of adjusting the first white balance data table corresponding to the image to be displayed into the second white balance data table comprises:

obtaining a red pixel white balance component, a green pixel white balance component, and a blue pixel white balance component of each gray level in the first white balance data table; and reducing a red pixel white balance component, a green pixel white balance component, and a blue pixel white balance component corresponding to at least one gray level according to a difference between power consumption of the heavy load image and preset power consumption.

12. The driving method of the display device of claim 11, wherein the step of reducing the red pixel white balance component, the green pixel white balance component, and the blue pixel white balance component corresponding to the at least one gray level according to the difference between the power consumption of the heavy load image and the preset power consumption comprises:

reducing the red pixel white balance component, the green pixel white balance component, and the blue pixel white balance component corresponding to the at least one gray level;

obtaining power consumption of the display device, and determining the second white balance data table if the power consumption of the display device is less than the preset power consumption; and continuing to reduce the red pixel white balance component, the green pixel white balance component, and the blue pixel white balance component until the power consumption of the display device is less than the preset power consumption if the power consumption of the display device is greater than the preset power consumption.

13. The driving method of the display device of claim 10, wherein the step of adjusting the first white balance data table corresponding to the image to be displayed into the second white balance data table comprises:

pre-configuring a correspondence table comprising multiple sets of heavy load images and corresponding white balance data tables; and searching in the correspondence table according to the heavy load image to match and obtain a corresponding second white balance data table if the image to be displayed is a heavy load image.

14. The driving method of the display device of claim 10, wherein before the step of driving the display device to display the image to be displayed according to the second white balance data table further comprises:

performing a gamma correction on the second white balance data table according to a target gamma curve.

* * * * *